United States Patent
Glazier et al.

(10) Patent No.: US 12,192,230 B2
(45) Date of Patent: Jan. 7, 2025

(54) DOMAIN REPUTATION SYSTEM

(71) Applicant: CEQUENCE SECURITY, INC., Sunnyvale, CA (US)

(72) Inventors: Will Glazier, Sunnyvale, CA (US); Khyati Ganatra, Santa Clara, CA (US); Shaunak Kapoor, Cincinnati, OH (US)

(73) Assignee: CEQUENCE SECURITY, INC., Sunnyvale, CA (US)

( * ) Notice: Subject to any disclaimer, the term of this patent is extended or adjusted under 35 U.S.C. 154(b) by 414 days.

(21) Appl. No.: 17/387,717

(22) Filed: Jul. 28, 2021

(65) Prior Publication Data
US 2022/0038469 A1 Feb. 3, 2022

Related U.S. Application Data

(60) Provisional application No. 63/057,729, filed on Jul. 28, 2020.

(51) Int. Cl.
*H04L 9/40* (2022.01)

(52) U.S. Cl.
CPC ........ *H04L 63/145* (2013.01); *H04L 63/0236* (2013.01); *H04L 63/1416* (2013.01); *H04L 63/1425* (2013.01)

(58) Field of Classification Search
CPC .............. H04L 63/145; H04L 63/0236; H04L 63/1416; H04L 63/1425
USPC ......................................................... 726/22
See application file for complete search history.

(56) References Cited

U.S. PATENT DOCUMENTS

| | | | |
|---|---|---|---|
| 11,070,579 B1* | 7/2021 | Kiernan | G06F 21/552 |
| 11,134,058 B1* | 9/2021 | Sole | G06F 21/552 |
| 2017/0024566 A1* | 1/2017 | Kuykendall | G06F 21/577 |
| 2018/0121659 A1 | 5/2018 | Sawhney et al. | |
| 2018/0336348 A1 | 11/2018 | Ng et al. | |
| 2019/0238544 A1* | 8/2019 | Rajahram | H04L 63/101 |
| 2021/0185008 A1* | 6/2021 | Nagaraja | G06Q 20/367 |
| 2021/0288937 A1* | 9/2021 | Vijayvargiya | H04L 63/101 |

OTHER PUBLICATIONS

Nguyen, "Large-Scale Detection of DOM-based XSS based on Publisher and Subscriber Model", 2016, Hongik University. (Year: 2016).*

* cited by examiner

*Primary Examiner* — Michael R Vaughan
*Assistant Examiner* — Saad Ahmad Abdullah

(57) ABSTRACT

Techniques to facilitate domain reputation analysis and prevention of malicious attacks on a web service are disclosed herein. In at least one implementation, web resources associated with the web service are crawled to obtain information about internal and external web assets associated with the web service. The information about the internal and external web assets is processed to identify domains with which the internal and external web assets communicate. The domains are analyzed to determine name server reputation, internet protocol (IP) address reputation, and hosting provider reputation associated with the domains. Individual domain reputation scores for each of the domains are generated based on the name server reputation, IP address reputation, and hosting provider reputation associated with the domains.

20 Claims, 6 Drawing Sheets

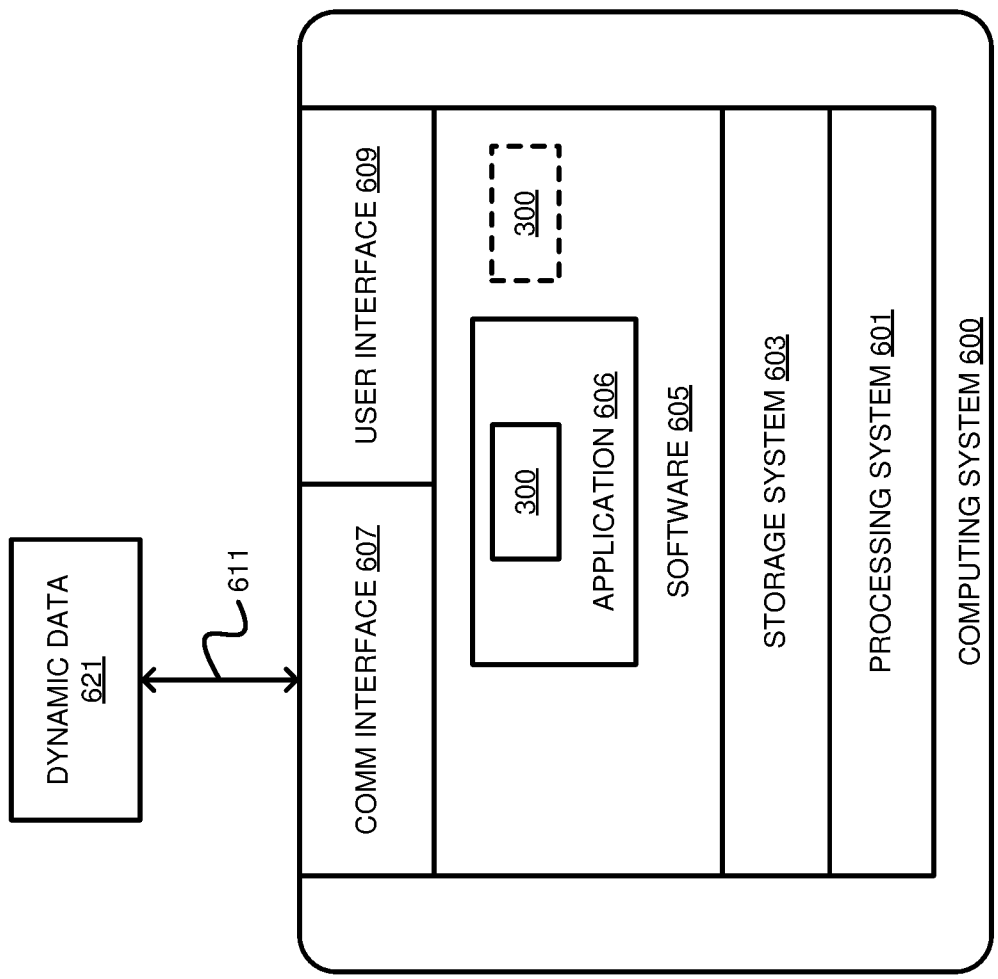

DOMAIN REPUTATION SYSTEM

RELATED APPLICATIONS

This application claims the benefit of, and priority to, U.S. Provisional Patent Application No. 63/057,729, entitled "DOMAIN REPUTATION SYSTEM", filed Jul. 28, 2020, which is hereby incorporated by reference in its entirety for all purposes.

TECHNICAL BACKGROUND

Security of a web service is of upmost importance to both the operators of the website and its users. As more people utilize the Internet to communicate and conduct business transactions and other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, dependencies on compromised third-party providers, and other security threats.

Digital skimming is a growing security problem for web applications that results in the theft of sensitive user information such as user credentials, credit card numbers, social security numbers, and other private information. In some examples, digital skimming can occur when an element of malicious JavaScript code is inserted somewhere in the web application that allows a remote attacker to skim sensitive user inputs, or a malicious iframe is created with a fake user input form. This threat is particularly dangerous for companies that depend on third-party providers to manage certain aspects of their web service, such as user registration, login, payment, checkout, advertising, usage tracking, and other services. In such cases, when the compromised code is introduced from a third-party provider that the site depends on, users of the website may have their sensitive data stolen, even though the website itself was never breached. Additionally, when websites are breached directly, either through takeover of administrator credentials or some other known vulnerability, attackers can place malicious elements directly into the code of the website, which often remain undetected for long periods of time.

Overview

Techniques to facilitate domain reputation analysis and prevention of malicious attacks on a web service are disclosed herein. In at least one implementation, web resources associated with the web service are crawled to obtain information about internal and external web assets associated with the web service. The information about the internal and external web assets is processed to identify domains with which the internal and external web assets communicate. The domains are analyzed to determine name server reputation, internet protocol (IP) address reputation, and hosting provider reputation associated with the domains. Individual domain reputation scores for each of the domains are generated based on the name server reputation, IP address reputation, and hosting provider reputation associated with the domains.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 6 is a block diagram that illustrates a computing system.

DETAILED DESCRIPTION

Figure 1:
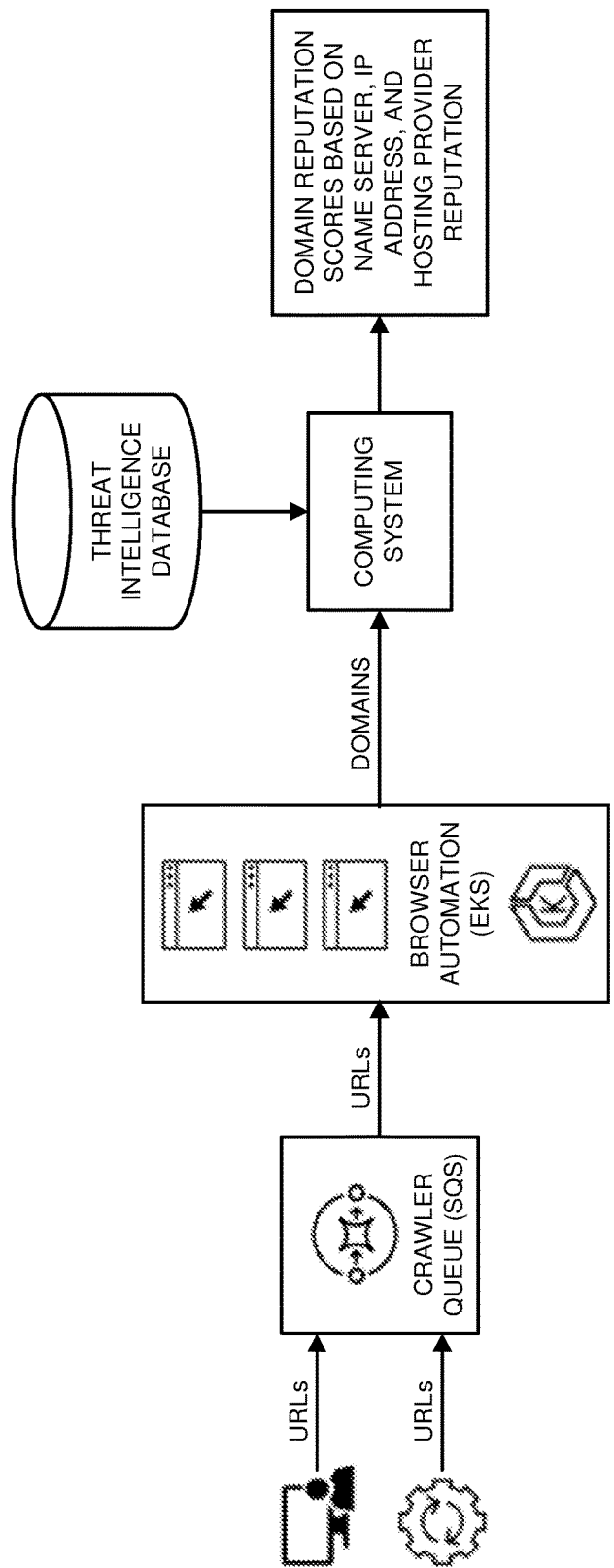
FIG. 1 is a block diagram that illustrates an operation of a communication system in an exemplary embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Digital skimming attacks, also known as Magecart attacks, JavaScript sniffing, and web skimming, are an increasing problem for website owners and the security of private user information. Digital skimming attacks are typically carried out by attackers installing their own malicious JavaScript code on web sites, either by directly embedding the code on a website itself or indirectly through third-party service providers that the site depends on. The undetected malicious code then functions to skim user account credentials, credit card information, and other sensitive data while users are interacting with the website.

As a website owner, it is very difficult to control the development and security of third-party tools and services. Further, because third-party JavaScript code and third-party browser extensions get loaded by client browsers at runtime, the website owner has little to no transparency into what is actually being added or downloaded at the individual browser level from third-party application servers. To help combat code injection attacks and cross-site scripting, modern web browsers support content security policy (CSP), which enables website administrators to specify the domains that the browser can trust as valid sources of executable scripts and other code. Subresource integrity (SRI) is a similar security mechanism that is often utilized in conjunction with CSP to protect website integrity. By specifying what resources a website depends on along with their approved origins and security hashes, SRI can be used to validate web assets provided by third parties, such as content delivery networks (CDNs) and other third-party services. To enable CSP, a website administrator needs to configure the web server to return the Content-Security-Policy hypertext transfer protocol (HTTP) header and provide values to specify resources the browser is allowed to load. However, because creating and maintaining these policies is a very laborious and manual process, it can be difficult and burdensome for website developers and administrators to implement CSP and SRI and keep up to date with changes on the site and changes made by third-party service providers.

The techniques disclosed herein provide for the protection of web applications from digital skimming attacks by automatically determining dependencies of the web service and then analyzing the reputation of the domains with which the dependencies communicate. By utilizing browser automation and a novel browser extension, the domain reputation analysis system described herein operates by passively scanning web applications using a scalable system of crawlers to obtain information about first-party internal web assets and third-party external web assets along with the domains to which these assets call or send data outbound from pages belonging to the web service. This domain information may then be processed with a threat intelligence database and utilize graph analysis to determine domain reputation data. Specifically, the dependency and domain data that is acquired by passively crawling the website may be analyzed against a database of information designed to alert if a particular domain being called is potentially suspicious or known to be malicious. In at least one implementation, this analysis may comprise scoring the reputation of the name server used by the domain, the specific IP address hosting the domain, the "neighborhood" of IP addresses belonging to the hosting provider, and whois registration information about the domain itself. In some implementations, elements of these scores may comprise the past presence and behavior of the IP addresses and other hosting infrastructure in the threat intelligence database, which may contain information related to other application security threats that were observed previously. In addition, the analysis may also include scoring on the reliability of the domains hosting the assets, derived from known patterns in whois information like the age of the domain, the registrar and registrant information, and their connection to either legitimate businesses or known malicious infrastructure. Finally, the analysis may take into account the relationship between web assets in the graph, where assets that are highly trusted and reputable tend to have different relationship patterns than assets that may be suspicious or designed to mimic another service to execute a digital skimming attack. In at least one implementation, the outcome of this automated analysis may comprise assigning individual domain reputation scores for all domains in the graph based on the various attributes described above. Further, in some implementations, content security policies could be dynamically created periodically from the domain reputation scores and graph data analysis, which may then be deployed via CDNs and application integration to protect the web service.

These techniques provide an advantage by enabling website administrators to detect digital skimming attacks without any active page modification or changes to CDNs or application servers. The system affords website owners with visibility into third-party dependencies and the domains that may receive outbound data to help bring awareness to the JavaScript code and other web assets that are being rendered on their site at the client browser level. Further, with the knowledge that these techniques provide about the reputation of the domains that assets on the website communicate with, the website operators can engage in reporting and enforcement of policies designed to protect their site from digital skimming attacks.

Figure 2:
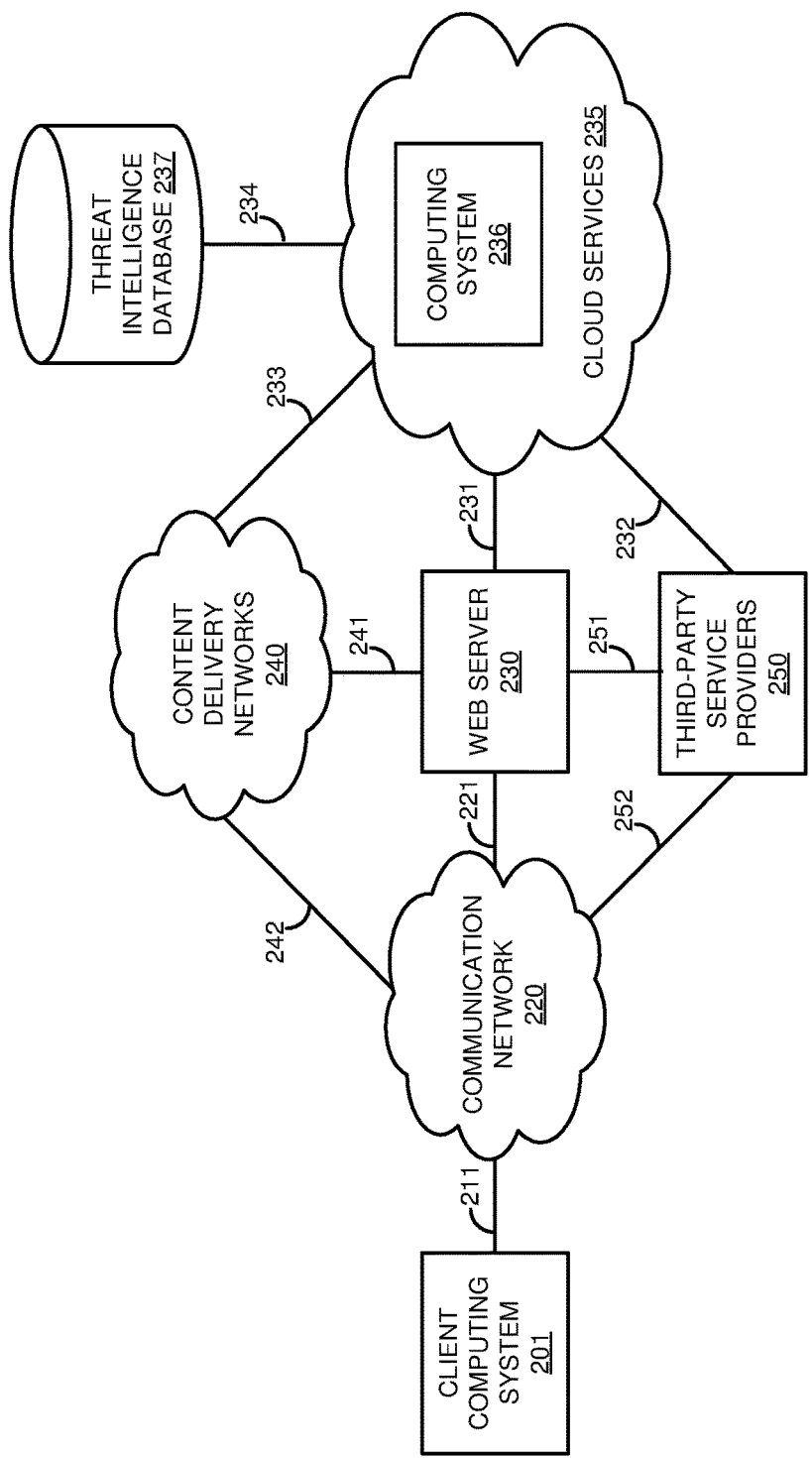
FIG. 2 is a block diagram that illustrates a communication system in an exemplary embodiment.
Figure 3:
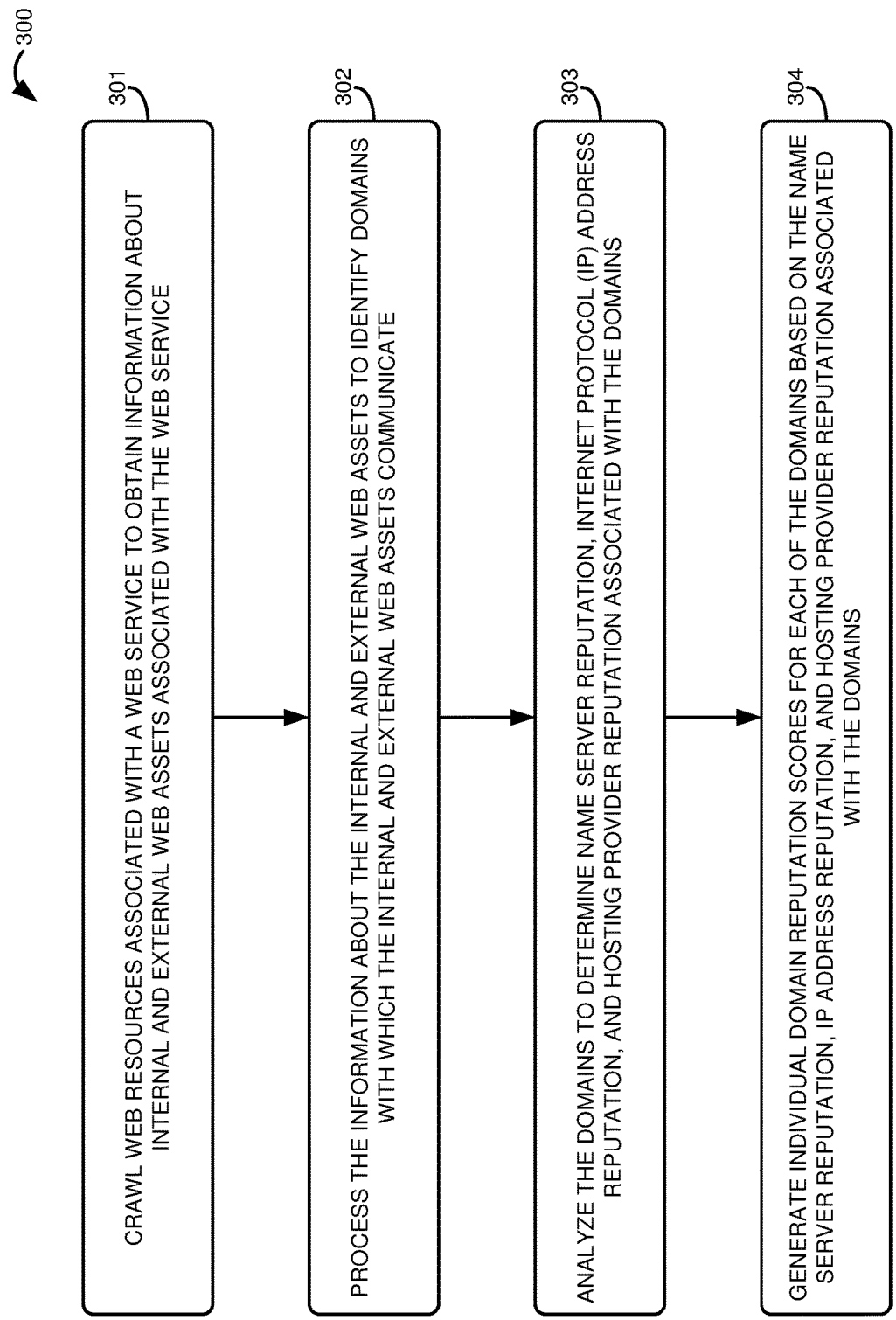
FIG. 3 is a flow diagram that illustrates an exemplary operation of the communication system.
Figure 4:
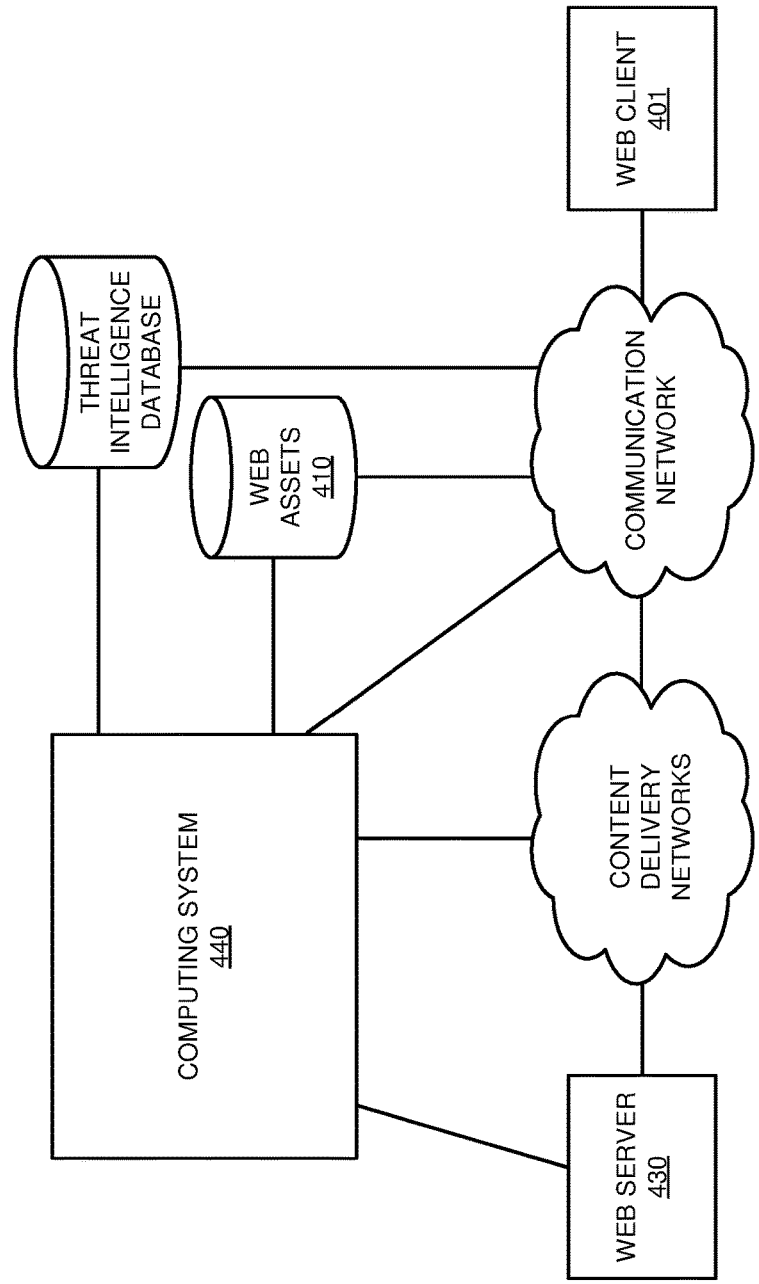
FIG. 4 is a block diagram that illustrates a communication system in an exemplary embodiment.
Figure 5:
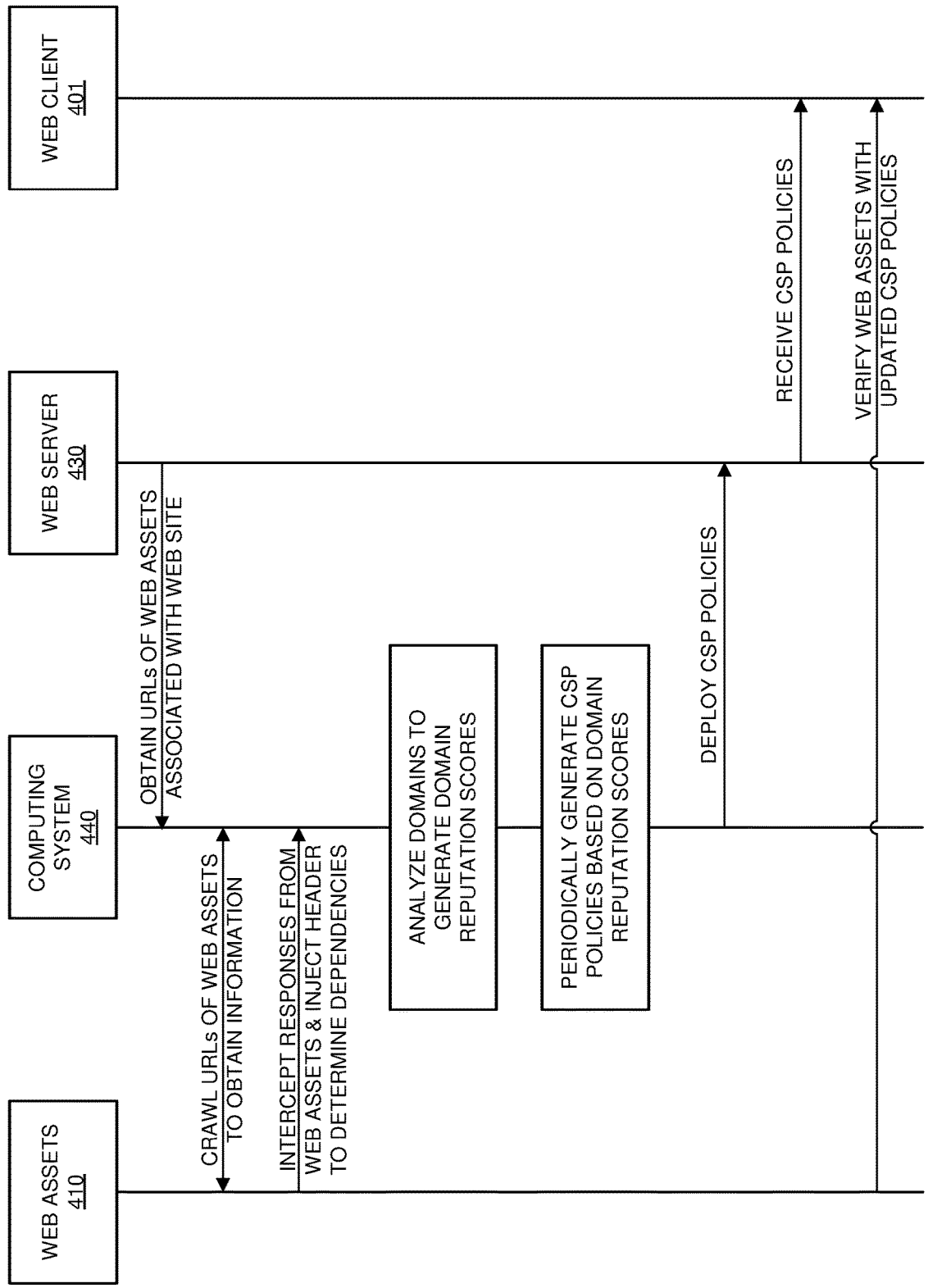
FIG. 5 is a sequence diagram that illustrates an exemplary operation of the communication system.

Referring now to the drawings, FIG. 1 illustrates a communication system that describes the design and flow of a domain reputation analysis system in an exemplary implementation. FIG. 2 illustrates another communication system that may be used to analyze domain reputations and help detect digital skimming attacks on a web service in an exemplary embodiment. FIG. 3 illustrates a flow diagram of an exemplary operation to facilitate domain reputation analysis and prevention of malicious digital skimming attacks on a web service. FIG. 4 illustrates another communication system that may be used to analyze domain reputations and help detect digital skimming attacks on a web service in an exemplary embodiment. FIG. 5 illustrates a sequence diagram of an exemplary operation to analyze domain reputations and prevent malicious digital skimming attacks on a website. FIG. 6 illustrates an exemplary computing system that may be used to perform any of the domain reputation analysis processes and operational scenarios described herein. One possible design and operational flow of a domain reputation analysis system will now be described in detail with respect to FIG. 1.

Turning now to FIG. 1, communication system 100 illustrates an exemplary design and operational flow of a domain reputation analysis system in an exemplary implementation. Communication system 100 provides an example of a system that may be used to implement a domain reputation analysis process to facilitate domain reputation analysis and prevention of malicious attacks on a web service as described herein. Communication system 100 provides an example of one possible implementation of a domain reputation analysis architecture that may be employed to implement a domain reputation analysis process as described herein, but note that other implementations could employ different architectures with additional and/or alternative components, services, and systems. The techniques described below with respect to FIG. 1 could be combined with operation 300 of FIG. 3 in some implementations.

In this example, the website and uniform resource locators (URLs) to crawl are added to a crawler queue. The URLs can either be manually submitted to the queue or could be automated to periodically re-crawl existing URLs, such as on a daily basis. In this example, the crawler queue is implemented using Amazon® Simple Queue Service (SQS), but any suitable message queuing service could also be used, such as Microsoft® Azure™ Service Bus, Kafka, Redis, ActiveMQ, RabbitMQ, and others. When setting up automated URL crawling, a time-based job scheduler such as cron jobs could be created to wake up periodically to re-crawl existing URLs. In this example, the cron jobs for the automated URL crawling could be created using Amazon® Elastic Kubernetes Service (EKS), but any suitable Kubernetes service could also be used, such as Microsoft® Azure™ Kubernetes Service, Google® Kubernetes Engine, Kubernetes Operations (kops), open-source Kubernetes (K8s), Rancher, and others.

Once the web site and specified URLs are loaded into the crawler queue, the website and URLs are crawled to obtain information about third-party external JavaScript assets, as well as first-party internal JavaScript assets, and the domains to which these scripts call or send data outbound from pages belonging to the web service being protected. In particular, each URL gets picked up by one of the auto-scalable crawlers using headless browser automation with a specialized security scanner browser extension that intercepts and injects a CSP header into the responses to collect CSP and SRI information. The automated browsers load each page and using their built-in CSP report-only mechanism (i.e., HTTP Content-Security-Policy-Report-Only response header), the browsers report all internal and external dependencies and associated domain information. In some implementations, the internal and external dependencies and associated domain information may be reported by the automated browsers to a CSP application programming interface (API) gateway. In such implementations, the CSP API gateway may invoke an event-driven serverless compute platform with all the submitted information in a CSP report, and the compute platform could responsively write the raw data to a cloud storage service, independently-operated database system, or any other storage system for long-term storage, including combinations thereof.

In this example, the dependency and domain information is received by a computing system for processing, which could comprise an independently-operated computing system or a cloud-based computing service in some examples. The computing system is in communication with a threat intelligence database that comprises historical attack information related to other application security threats that were previously observed. The threat intelligence database may be updated periodically with newly-detected attacks and other security threats to develop the database over time.

Upon receipt of the dependency and domain information, the computing system may then process this information with the threat intelligence database and employ graph analysis to determine domain reputation scores for the identified domains. In particular, the dependency and domain data may be analyzed by the computing system against the threat intelligence database to determine if a particular domain being called is potentially suspicious or known to be malicious. In at least one implementation, the computing system may perform this analysis and generate domain reputation scores by scoring the reputation of the name server used by the domain, the specific IP address hosting the domain, the "neighborhood" of IP addresses belonging to the hosting provider, such as all IP addresses in a classless inter-domain routing (CIDR) range, and whois registration information about the domain itself, among other information. In some implementations, the domain reputation scores may be based on both publically-available information and internal reputation monitoring and scoring algorithms. For example, the domain reputation scores could be based on any information about known attacks associated with any of the domains, scripts, or other web assets identified in the dependency information, along with domain registration information, domain name servers, IP addresses of the domains, length of time that a domain has been registered, the expiration date of the domain registration, the identity of the registrar and registrant, other domains that the registrant has registered before and whether any of those sites were associated with security risks or malicious or suspicious activity, and any other relevant data. This information could then be processed through an internal threat intelligence database that identifies particular name servers, IP addresses, and hosting providers that have been associated with suspicious activity or malicious attacks in the past in order to determine the domain reputation scores for the domains that are associated with the web service.

In some implementations, the threat intelligence database could comprise hosting provider reputation data, IP address reputation data, and name server reputation data. The hosting provider reputation data could include scoring on the reliability of the hosting provider, which may be derived from known patterns in publically-available whois domain registration information, such as the registrar and registrant information and the age of the domain, where older and more established domains are less of a security risk than newly-registered domains. In some implementations, the hosting provider reputation score could also account for the activity of the IP addresses in the "neighborhood" of a given IP address belonging to the hosting provider, such as analyzing all IP addresses in a CIDR range. Regarding the IP address reputation data, an IP address score may be determined by a combination of the past activity associated with an IP address based on the threat intelligence database along with an analysis of other domains hosted on that IP address. Finally, regarding the name server reputation, there are distinctive patterns that positively differentiate legitimate name servers that host websites of legitimate companies versus name servers that host potentially malicious domains, so an analysis of the domains hosted on a name server can provide an indication about the reliability of the name server. In some implementations, elements of these reputation scores may comprise the historical presence and behavior of the name servers, IP addresses, and other hosting infrastructure that is tracked in the threat intelligence database, along with the reliability of the domains hosting the assets, which may be derived from known patterns in whois information like the age of the domain, the registrar and registrant information, and their connection to either legitimate businesses or known malicious infrastructure.

In at least one implementation, the threat intelligence database could include a list of name servers, IP addresses, and hosting platforms that are commonly used to host malware or command-and-control servers controlled by attackers, and such servers are also often used to host other illegitimate activities such as media pirating, online gambling, and illegal file sharing. Further, in some implementations, the ratio of the number of unique domains to number of unique companies or entities could be calculated for a particular hosting platform, IP address, or name server to determine a security risk factor associated with that host or server. For example, a name server or IP address associated with a hosting infrastructure that tends to be exploited by malicious users will have a ratio of the number of unique domains to number of unique companies closer to 1:1, where every domain belongs to a different company or entity. However, because legitimate websites tend to register many different variations of their top-level domain (TLD) using the same hosting platform and name server, a more legitimate provider will have a ratio that is lower than 1:1, such as 2:1 or even 3:1, for example.

Each of the above factors and considerations could be scored individually and then compiled together to form an overall domain reputation score for each of the domains that are associated with the web service. In some implementations, the reputational scoring process discussed above could comprise graph analysis that takes into account the relationship between web assets in the graph, where assets that are highly trusted and reputable tend to have different relationship patterns than assets that may be suspicious or designed to mimic another service to execute a digital skimming attack. In at least one implementation, the outcome of this automated analysis may comprise assigning individual domain reputation scores for all domains in the graph based on the various attributes described above.

In at least one implementation, content security policies may then be dynamically created periodically from the domain reputation scores and graph data analysis, which may then be deployed via CDNs and application integration to protect the web service. For example, in some implementations, the domain reputation scores may be used along with script reputation data to enrich the information about the internal and external web assets associated with the web service to generate enriched dependency graph data. In at least one implementation, data enrichment drivers may enrich the raw data from the CSP report with the domain reputation scores and script reputation data and persist the reputation-enriched data in graph format to a graph database. Security policies may then be automatically generated periodically from graph data analysis. In some examples, the policies generated could comprise CSP policy directives, SRI integrity hash values, approved origins, trusted domains, and any other information that may be used for CSP and SRI policy deployment. In at least one implementation, such policies could be created manually through a dashboard as well.

In some implementations, once the security policies are dynamically generated, the policies may be deployed to help protect the web application. For example, in at least one implementation, a CSP policy deployment mechanism may provide integration with the web server and different CDNs to push or pull the periodically-generated or updated policies to protect the web application without actively modifying web pages or application servers. Without employing the above techniques, CSP policies often require manual creation and updating, which results in policies remaining static and outdated for long periods of time, rendering them largely ineffective. Beneficially, the domain reputation analysis techniques disclosed herein along with dynamic policy creation and deployment help to prevent digital skimming attacks proactively, without requiring any changes to the web application, servers, or CDNs. By providing greater visibility into the reputation of domains associated with third-party web assets, along with integration with CDNs and security solutions without actively modifying web applications, digital skimming attacks that often originate through third-party JavaScript code and other web assets are more rapidly identified and prevented. Another communication system that may be used to analyze domain reputations and help prevent digital skimming attacks on a web service will now be described with respect to FIG. 2.

FIG. 2 illustrates communication system 200 which may be used to analyze domain reputations and detect digital skimming attacks on a web service in an exemplary implementation. Communication system 200 provides an example of a system that may be used to implement a domain reputation analysis process to facilitate domain reputation analysis and prevention of malicious attacks on a web service as described herein. Communication system 200 provides an example of one possible implementation of a domain reputation analysis architecture that may be employed to implement a domain reputation analysis process as described herein, but note that other implementations could employ different architectures with additional and/or alternative components, services, and systems. In this example, communication system 200 includes client computing system 201, communication network 220, web server 230, cloud services 235, computing system 236, threat intelligence database 237, content delivery networks (CDNs) 240, and third-party service providers 250. An operation that may be employed to facilitate domain reputation analysis and prevention of malicious attacks on a web service will now be described with respect to FIG. 3.

FIG. 3 is a flow diagram that illustrates an operation 300 in an exemplary implementation. The operation 300 shown in FIG. 3 may also be referred to as domain reputation analysis process 300 herein. The steps of the operation are indicated below parenthetically. The following discussion of operation 300 may proceed with reference to elements of FIG. 2 in order to illustrate its operations, but note that the details provided in FIG. 2 are merely exemplary and not intended to limit the scope of process 300 to the specific implementation shown in FIG. 2. Operation 300 may also be combined with the techniques described above with respect to FIG. 1 in some implementations.

Operation 300 may be employed to facilitate domain reputation analysis and prevention of malicious attacks on a web service. As shown in the operational flow of process 300, computing system 236 crawls web resources associated with the web service to obtain information about internal and external web assets associated with the web service (301). In at least one implementation, the web resources associated with the web service could be crawled by passively scanning a website provided by the web service and any associated uniform resource identifiers (URIs) using a scalable system of crawlers. The crawlers may be implemented on an independent server computing system or supplied by a cloud service provider in some implementations. The information obtained about the internal and external web assets associated with the web service could comprise information about JavaScript assets, cascading style sheets (CSS), HTML, frames and other code, fonts, images, audio and video files, embeddable objects such as Java™ applets, and the domains to which these scripts and other web assets communicate with or send data outbound from pages belonging to the web service. In some examples, the internal web assets could comprise any internal first-party web assets that are included by the web service owner directly, and the external web assets could comprise any external third-party web assets that are indirectly included and managed by external third-party service providers.

Computing system 236 processes the information about the internal and external web assets to identify domains with which the internal and external web assets communicate (302). For example, in some implementations, computing system 236 could process the information obtained about the internal and external web assets to determine the domains to which these scripts and other assets communicate or send data outbound from web pages associated with the web service being protected. In at least one implementation, in order to process the information about the internal and external web assets to identify the domains with which the internal and external web assets communicate, computing system 236 could intercept responses from the internal and external web assets and dynamically inject content security policy headers into the responses to determine dependency data associated with the internal and external web assets to identify the domains with which the internal and external web assets communicate. In some implementations, to intercept the responses from the internal and external web assets and dynamically inject the content security policy headers into the responses, computing system 236 could utilize browser automation with a browser extension to intercept the responses from the internal and external web assets and dynamically inject the content security policy headers into the responses to determine all dependencies and the domains associated with the internal and external web assets. For example, in at least one implementation, computing system 236 could intercept the responses from the internal and external web assets using headless browser automation with a specialized security scanner browser extension that intercepts and injects a CSP header into the responses received from the internal and external web assets associated with the web service to collect dependency data and identify the domains associated with the internal and external web assets. The browser automation and CSP header injection may be implemented on an independent server computing system or supplied by a cloud service provider in some implementations. In at least one implementation, after the responses are injected with the CSP header, the browser automation may load each page and use a built-in CSP report-only mechanism (i.e., HTTP Content-Security-Policy-Report-Only response header) to determine and report all dependencies and the domains associated with the internal and external web assets. For example, computing system 236 could utilize the browser automation with the browser extension to intercept the responses from the internal and external web assets and dynamically inject content security policy report-only response headers into the responses to determine dependency data associated with the internal and external web assets to identify the domains.

Computing system 236 analyzes the domains to determine name server reputation, IP address reputation, and hosting provider reputation associated with the domains (303). In at least one implementation, computing system 236 may analyze the domains against threat intelligence database 237 to determine if a particular domain is potentially suspicious or known to be malicious. For example, in some implementations, analyzing the domains to determine the name server reputation, the IP address reputation, and the hosting provider reputation associated with the domains could comprise analyzing domain registration information associated with the domains to determine the name server reputation, the IP address reputation, and the hosting provider reputation associated with the domains. In at least one implementation, this analysis could comprise scoring the reputation of the name server used by the domain, the reputation of the IP address that hosts the domain, and the reputation of the hosting provider associated with the domain. In some implementations, elements of these reputation scores may comprise the historical presence and behavior of the name servers, IP addresses, and other hosting infrastructure that is tracked in threat intelligence database 237, along with the reliability of the domains hosting the assets, which may be derived from known patterns in whois domain registration information like the age of the domain, the registrar and registrant information, and their connection to either legitimate businesses or known malicious infrastructure.

In some implementations, in order to determine the name server reputation, IP address reputation, and hosting provider reputation associated with the domains, computing system 236 may first analyze the domains to identify all of the name servers, IP addresses, and hosting providers associated with the domains. Once these elements are known, computing system 236 may analyze the name servers, IP addresses, and hosting providers associated with the domains against threat intelligence database 237 to determine the name server reputation, IP address reputation, and hosting provider reputation associated with the domains. In this example, threat intelligence database 237 could comprise information that identifies particular name servers, IP addresses, and hosting providers that have been associated with suspicious activity or malicious attacks in the past, along with other security data. Accordingly, in at least one implementation, analyzing the domains to determine the name server reputation, the IP address reputation, and the hosting provider reputation associated with the domains could comprise analyzing whether any name servers, IP addresses, or hosting providers associated with the domains were previously associated with malicious attacks.

In some implementations, the name server reputation associated with the domains could be determined by processing the name servers associated with the domains through threat intelligence database 237 to conduct an analysis of the various other domains hosted on a particular name server, which can provide an indication about the reliability of the name server. For example, there are distinctive patterns that positively differentiate legitimate name servers that host websites of legitimate companies versus name servers that host potentially malicious domains. Moreover, if any domains associated with suspicious or malicious activity in the past used one of the name servers being analyzed, this factor would negatively impact the reputation score of that name server.

In at least one implementation, the IP address reputation associated with the domains could be determined by processing the IP addresses associated with the domains through threat intelligence database 237 to analyze the IP addresses and assign reputation scores by a combination of the past suspicious or malicious activity associated with an IP address according to threat intelligence database 237 along with an analysis of other domains hosted on that IP address. For example, if any domains associated with suspicious or malicious activity in the past used one of the IP addresses being analyzed, this factor would negatively impact the reputation score of that IP address.

In some implementations, the hosting provider reputation associated with the domains could be determined by processing the hosting providers associated with the domains through threat intelligence database 237 to analyze and score the reliability of the hosting providers. For example, computing system 236 could derive known patterns in the whois domain registration information such as the length of time that a domain has been registered, the expiration date of the domain registration, the identity of the registrar and registrant, other domains that the registrant has registered before and whether any of those sites were associated with security risks or malicious or suspicious activity, and any other information about the hosting provider that is publically available in the domain registration information. In at least one implementation, the hosting provider reputation associated with the domains could also account for the activity of the IP addresses in the "neighborhood" of a given IP address belonging to the hosting provider, such as analyzing all IP addresses in a CIDR range of an IP address associated with the hosting provider undergoing analysis. Further, if any domains associated with suspicious or malicious activity in the past used one of the hosting providers being analyzed, this factor would negatively impact the reputation score of that hosting provider.

In at least one implementation, threat intelligence database 237 could include a list of name servers, IP addresses, and hosting providers that are commonly used to host malware or command-and-control servers controlled by attackers, and such servers are also often used to host other illegitimate activities such as media pirating, online gambling, and illegal file sharing. Therefore, any association with hosting these other illegitimate activities would negatively impact the reputation score of a given name server, IP address, and/or hosting provider. Accordingly, in at least one implementation, analyzing the domains to determine the name server reputation, the IP address reputation, and the hosting provider reputation associated with the domains could comprise analyzing whether any name servers, IP addresses, or hosting providers associated with the domains were previously involved in hosting illegitimate activities. Further, in some implementations, the ratio of the number of unique domains to number of unique companies or entities could be calculated for a particular hosting provider, IP address, and/or name server to determine a security risk factor associated with that host or server. For example, a name server or IP address associated with a hosting infrastructure that tends to be exploited by malicious users will have a ratio of the number of unique domains to number of unique companies closer to 1:1, where every domain belongs to a different company or entity. However, because legitimate websites tend to register many different variations of their top-level domain (TLD) using the same hosting provider, IP address, and name server, a more legitimate provider will have a ratio that is lower than 1:1, such as 2:1 or even 3:1, for example. Any of the above factors could be utilized by computing system 236 to analyze the domains to determine name server reputation, IP address reputation, and hosting provider reputation associated with the domains. Further, additional factors and considerations may be used to analyze the domains to determine name server reputation, IP address reputation, and hosting provider reputation associated with the domains and are within the scope of this disclosure.

Computing system 236 generates individual domain reputation scores for each of the domains based on the name server reputation, IP address reputation, and hosting provider reputation associated with the domains (304). For example, to generate the individual domain reputation scores for each of the domains, all of the above factors and considerations could be scored individually and then compiled together to form an overall domain reputation score for each of the domains that are associated with the web service. In at least one implementation, computing system 236 could process the individual name server reputation, IP address reputation, and hosting provider reputation associated with the domains by aggregating the individual reputation scores of the name server, IP address, and hosting provider for each of the domains to generate the individual domain reputation scores for each of the domains. In some implementations, the reputational scoring process discussed above could comprise graph analysis that takes into account the relationship between web assets in the graph, where assets that are highly trusted and reputable tend to have different relationship patterns than assets that may be suspicious or designed to mimic another service to execute a digital skimming attack. The outcome of this automated analysis could comprise assigning individual domain reputation scores for all domains in the graph based on the various attributes described above. For example, in at least one implementation, generating the individual domain reputation scores for each of the domains based on the name server reputation, the IP address reputation, and the hosting provider reputation associated with the domains could comprise performing graph analysis on relationships between the internal and external web assets and generating the individual domain reputation scores for each of the domains based on the graph analysis.

In some implementations, content security policies for the web service may be dynamically generated based on the individual domain reputation scores for each of the domains. For example, in at least one implementation, content security policies could be dynamically generated based on the individual domain reputation scores for any domain having a domain reputation score that exceeds a threshold reputation level indicative of a potential security risk. Further, in some implementations, the content security policies for the web service may be dynamically generated based on the individual domain reputation scores for each of the domains and graph data analysis. For example, in at least one implementation, once the individual reputation scores for each of the domains are generated, these domain reputation scores may then be used to enrich the information about the internal and external web assets associated with the web service to generate enriched dependency graph data. In some implementations, computing system 236 may enrich the raw data comprising the information about the internal and external web assets with the individual reputation scores for each of the domains and persist the reputation-enriched data in graph format to a graph database. Content security policies may then be automatically generated periodically from graph data analysis. For example, in at least one implementation, computing system 236 could analyze the enriched dependency graph data to dynamically generate content security policies for the web service. Some examples of the security policies that may be dynamically generated include CSP policy directives, SRI integrity hash values, cross-origin resource sharing (CORS) settings attributes, approved origins, trusted domains, and any other information that may be used for CSP and SRI policy deployment. In some implementations, the content security policies for the web service may be dynamically generated periodically from graph data analysis on the reputation-enriched dependency data in graph format. This periodic graph data analysis works to dynamically generate the content security policies on a regular basis, which ensures that the policies remain effective and are always kept up to date.

In at least one implementation, computing system 236 may also be configured to deploy the dynamically-generated security policies to protect the web service. In some implementations, content security policies may be deployed to the web server 230 to help protect the web service, which may be deployed periodically to help ensure the policies are kept current and regularly updated. In at least one implementation, the content security policies may also be deployed to the CDNs 240 as well. For example, to deploy the policies to protect the web service, computing system 236 may include integration with different CDNs 240 to push or pull the dynamically-generated and periodically-updated policies to protect the web application without actively modifying the web pages or application servers associated with the web service. In some implementations, the content security policies may be deployed via CDNs 240 and application integration. For example, after the content security policies are generated, the policies may be fed back to the origination point, either the CDNs 240 or the web server 230, which can then take action to enforce the security policies by including the policies in their web pages.

Advantageously, the techniques disclosed herein provide for domain reputation analysis and scoring, which may be utilized to strongly protect web applications from digital skimming attacks without requiring any changes to the web application, servers, or CDNs. By passively scanning web applications using a scalable system of crawlers and providing visibility into third-party dependencies and information about the reputation of the domains that assets on the website communicate with, website owners are better informed of the JavaScript code and other web assets that are being rendered on a website at the client browser level. Further, by enriching the dependency data with the domain reputation scores and performing graph analysis to dynamically generate content security policies, web applications and CDNs can continuously receive updated policy information and prevent digital skimming attacks proactively by enforcing the security policies.

Turning now to FIG. 4, communication system 400 is illustrated which may be used to analyze domain reputations and detect digital skimming attacks on a web service in an exemplary embodiment. Communication system 400 provides an example of a system that may be used to implement a domain reputation analysis process to facilitate domain reputation analysis and prevention of malicious attacks on a web service as described herein. Communication system 400 provides an example of one possible implementation of a domain reputation analysis architecture that may be employed to implement a domain reputation analysis process as described herein, but note that other implementations could employ different architectures with additional and/or alternative components, services, and systems. In this example, communication system 400 includes web server 430, computing system 440, content delivery networks, a communication network, web assets 410, threat intelligence database, and web client 401. An exemplary operation of communication system 400 will now be discussed with respect to FIG. 5.

FIG. 5 is a sequence diagram that illustrates an operation of communication system 400 to analyze domain reputations to detect and prevent digital skimming attacks in an exemplary embodiment. Although the following description of FIG. 4 will proceed with reference to elements of communication system 300 of FIG. 3 in this example, the techniques described below with respect to FIG. 4 could also be executed by the systems of communication system 200 such as computing system 236, and could be combined with operation 300 of FIG. 3 in some implementations.

Initially, computing system 440 operates to obtain URLs of web assets 410 associated with the website to be protected. In this example, web assets 410 include both first-party web assets provided by the website owner and external web assets provided by third parties. In at least one implementation, the URLs could be provided manually by submitting the URLs to computing system 440, but computing system 440 may also analyze the web pages of the website received from web server 430 in order to automatically identify URLs associated with the website in some implementations. For example, computing system 440 could crawl the website to get information about web assets 410 and the domains to which these assets call or send data outbound from pages belonging to the website being protected. In some implementations, cron jobs could also be created to automate the process of periodically re-crawling existing URLs to obtain updated information about web assets 410.

In this example, computing system 440 intercepts responses from web assets 410 and dynamically injects a CSP header into each response to collect CSP and SRI information and determine dependencies of web assets 410. In at least one implementation, computing system 440 utilizes headless browser automation with a specialized security scanner browser extension to intercept the responses from web assets 410 and dynamically inject the CSP headers into the responses to determine all internal and external dependencies associated with the web assets 410. For example, the browser automation may load each web page and utilize a built-in CSP report-only mechanism (i.e., HTTP Content-Security-Policy-Report-Only response header) to determine and report the internal and external dependency data of web assets 410.

Computing system 440 may then process the information about the internal and external web assets 410, including the internal and external dependency data of web assets 410, to identify domains with which the internal and external web assets communicate. The domains are then analyzed to generate domain reputation scores. For example, the domain information may be processed with the threat intelligence database to determine domain reputation data, which may further utilize graph analysis in some implementations. In particular, the dependency and domain data that is acquired by passively crawling the website may be analyzed against the threat intelligence database which is designed to alert if a particular domain being called is potentially suspicious or known to be malicious. In some implementations, the domain reputation data may be based on both publically-available reputation information and internal reputation monitoring and scoring algorithms. The domains associated with all web assets 410, including any domains associated with all of their internal and external dependencies, are analyzed to determine the reputations of any name servers, IP addresses, and hosting providers associated with the domains. Computing system 440 then generates domain reputation scores for each of the domains based on the name server reputation, IP address reputation, and hosting provider reputation associated with the domains. In some implementations, elements of these scores may comprise the past presence and behavior in the threat intelligence database of the name servers, IP addresses, hosting providers, and other hosting infrastructure associated with the domains, which may contain information related to other application security threats that were observed previously. In addition, the domain analysis may also include scoring on the reliability of the domains hosting the assets, derived from known patterns in whois information like the age of the domain, the registrar and registrant information, and their connection to either legitimate businesses or known malicious infrastructure. In at least one implementation, computing system 440 may enrich the domain and dependency data associated with web assets 410 with the domain reputation scores and persist the enriched data in graph format to a graph database. In some implementations, the domain analysis may take into account the relationship between web assets in the graph, where assets that are highly trusted and reputable tend to have different relationship patterns than assets that may be suspicious or designed to mimic another service to execute a digital skimming attack. In at least one implementation, the outcome of this automated analysis may comprise assigning individual domain reputation scores for all domains in the graph based on the various attributes described above.

Continuing this example, computing system 440 periodically generates CSP policies based on the domain reputation scores. In at least one implementation, the CSP policies could include SRI hash values and other security policies to utilize in conjunction with the CSP policies. Some examples of the security policies that may be periodically generated include CSP directives, SRI hash values, CORS settings attributes, approved origins, trusted domains, and any other information that may be used for CSP and SRI policy deployment. In some implementations, computing system 440 could periodically generate the CSP policies based on the domain reputation scores by periodically generating the CSP policies based on graph data analysis of the enriched domains and dependency graph data that is enriched with the domain reputation scores. This periodic graph data analysis works to dynamically generate the CSP policies on a regular basis, which ensures that the policies remain effective and are always kept up to date.

Computing system 440 then deploys the CSP policies to protect the website. In this example, the CSP policies are deployed to web server 430, and may be deployed periodically to help ensure the policies are kept current and regularly updated. In some implementations, the CSP policies may also be deployed to one or more content delivery networks as well. For example, to deploy the policies to protect the website, computing system 440 may include integration with different CDNs to push or pull the periodically-updated CSP policies to protect the website without actively modifying the web pages or application servers associated with the website.

After the CSP policy deployment, when the web client 401 accesses the website URLs, web client 401 will receive responses that include CSP directives, SRI hash values, and other information that may be used for CSP and SRI policy deployment. The web browser executing on the web client 401 can then verify that web assets 410 are valid and received from known trusted sources as determined from the CSP directives and SRI hash values. Advantageously, these domain reputation scoring techniques along with dynamic security policy creation and deployment help to prevent digital skimming attacks proactively, without actively modifying web pages or requiring any changes to the website, web server 430, or CDNs. Further, by providing greater visibility into third-party dependencies of web assets 410 and reputation information associated with web assets 410, digital skimming attacks that often originate through third-party JavaScript code and other web assets 410 can be more rapidly detected and prevented, thereby greatly increasing the security of the website.

Now referring back to FIG. 2, communication system 200 includes client computing system 201, communication network 220, web server 230, cloud services 235, computing system 236, threat intelligence database 237, content delivery networks 240, and third-party service providers 250. Client computing system 201 and communication network 220 communicate over communication link 211. Communication network 220 and content delivery networks 240 communicate over communication link 242, while communication network 220 and third-party service providers 250 are in communication over communication link 252. Communication network 220 and web server 230 are in communication over communication link 221. Web server 230 and cloud services 235 communicate over communication link 231, while web server 230 and content delivery networks 240 are in communication over communication link 241. Web server 230 and third-party service providers 250 communicate over communication link 251. Cloud services 235 and content delivery networks 240 communicate over communication link 233, while cloud services 235 and third-party service providers 250 are in communication over communication link 232. Threat intelligence database 237 and cloud services 235 are in communication over communication link 234. In at least one implementation, computing system 236 may be utilized to implement a domain reputation analysis process to facilitate domain reputation analysis and prevention of malicious attacks on a web service as described herein. In this example, computing system 236 is shown as part of cloud services 235, but computing system 236 could be an independently-operated server computing system implemented separately from cloud services 235 in some implementations. In such implementations, computing system 236 could be in communication directly with web server 230, threat intelligence database 237, content delivery networks 240, and third-party service providers 250 over separate communication links and networks that do not include cloud services 235, but such network topology is not shown in FIG. 2 for clarity.

Client computing system 201 comprises a processing system and communication transceiver. Client computing system 201 may also include other components such as a user interface, data storage system, and power supply. Client computing system 201 may reside in a single device or may be distributed across multiple devices. Examples of client computing system 201 include mobile computing devices, such as cell phones, tablet computers, laptop computers, notebook computers, and gaming devices, as well as any other type of mobile computing devices and any combination or variation thereof. Examples of client computing system 201 also include desktop computers, server computers, and virtual machines, as well as any other type of computing system, variation, or combination thereof.

Communication network 220 could comprise multiple network elements such as routers, gateways, telecommunication switches, servers, processing systems, or other communication equipment and systems for providing communication and data services. In some examples, communication network 220 could comprise wireless communication nodes, telephony switches, Internet routers, network gateways, computer systems, communication links, or some other type of communication equipment, including combinations thereof. Communication network 220 may also comprise optical networks, asynchronous transfer mode (ATM) networks, packet networks, local area networks (LAN), metropolitan area networks (MAN), wide area networks (WAN), or other network topologies, equipment, or systems, including combinations thereof. Communication network 220 may be configured to communicate over metallic, wireless, or optical links. Communication network 220 may be configured to use time-division multiplexing (TDM), Internet Protocol (IP), Ethernet, optical networking, wireless protocols, communication signaling, or some other communication format, including combinations thereof. In some examples, communication network 220 includes further access nodes and associated equipment for providing communication services to several computer systems across a large geographic region.

Web server 230 may be representative of any computing apparatus, system, or systems that may connect to another computing system over a communication network. Web server 230 comprises a processing system and communication transceiver. Web server 230 may also include other components such as a router, server, data storage system, and power supply. Web server 230 may reside in a single device or may be distributed across multiple devices. Web server 230 may be a discrete system or may be integrated within other systems, including other systems within communication system 200. Some examples of web server 230 include database systems, desktop computers, server computers, cloud computing platforms, and virtual machines, as well as any other type of computing system, variation, or combination thereof. In some examples, web server 230 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Cloud services 235 comprise any cloud computing platform that provides computing services over a communication network. Cloud services 235 may be representative of any computing apparatus, system, or systems that may connect to another computing system over a communication network. In this example, cloud services 250 comprise computing system 236. Computing system 236 may be representative of any computing apparatus, system, or systems on which the techniques disclosed herein or variations thereof may be suitably implemented. Computing system 236 comprises a processing system and communication transceiver. Computing system 236 may also include other components such as a router, server, data storage system, and power supply. Computing system 236 may reside in a single device or may be distributed across multiple devices. Computing system 236 may be a discrete system or may be integrated within other systems, including other systems within communication system 200. Some examples of computing system 236 include database systems, desktop computers, server computers, cloud computing platforms, and virtual machines, as well as any other type of computing system, variation, or combination thereof. In some examples, computing system 236 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Threat intelligence database 237 may be representative of any computing apparatus, system, or systems that may connect to another computing system over a communication network. Threat intelligence database 237 comprises a data storage system and communication transceiver. Threat intelligence database 237 may also include other components such as a processing system, router, server, and power supply. Threat intelligence database 237 may reside in a single device or may be distributed across multiple devices. Threat intelligence database 237 may be a discrete system or may be integrated within other systems, including other systems within communication system 200. Some examples of threat intelligence database 237 include database systems, desktop computers, server computers, cloud computing platforms, and virtual machines, as well as any other type of computing system, variation, or combination thereof. In some examples, threat intelligence database 237 could comprise a stand-alone database system, a cloud-based storage service, or any other data storage system, including combinations thereof.

Content delivery networks 240 may be representative of any computing apparatus, system, or systems that may connect to another computing system over a communication network. Content delivery networks 240 comprise a processing system and communication transceiver. Content delivery networks 240 may also include other components such as a router, server, data storage system, and power supply. Content delivery networks 240 may reside in a single device or may be distributed across multiple devices. Content delivery networks 240 may be a discrete system or may be integrated within other systems, including other systems within communication system 200. Some examples of content delivery networks 240 include database systems, desktop computers, server computers, cloud computing platforms, and virtual machines, as well as any other type of computing system, variation, or combination thereof. In some examples, content delivery networks 240 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Third-party service providers 250 may be representative of any computing apparatus, system, or systems that may connect to another computing system over a communication network. Third-party service providers 250 comprise a processing system and communication transceiver. Third-party service providers 250 may also include other components such as a router, server, data storage system, and power supply. Third-party service providers 250 may reside in a single device or may be distributed across multiple devices. Third-party service providers 250 may be a discrete system or may be integrated within other systems, including other systems within communication system 200. Some examples of third-party service providers 250 include database systems, desktop computers, server computers, cloud computing platforms, and virtual machines, as well as any other type of computing system, variation, or combination thereof. In some examples, third-party service providers 250 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Communication links 211, 221, 231, 232, 233, 234, 241, 242, 251, and 252 use metal, air, space, optical fiber such as glass or plastic, or some other material as the transport medium, including combinations thereof. Communication links 211, 221, 231, 232, 233, 234, 241, 242, 251, and 252 could use various communication protocols, such as TDM, IP, Ethernet, telephony, optical networking, hybrid fiber coax (HFC), communication signaling, wireless protocols, or some other communication format, including combinations thereof. Communication links 211, 221, 231, 232, 233, 234, 241, 242, 251, and 252 could be direct links or may include intermediate networks, systems, or devices.

Referring now to FIG. 6, a block diagram that illustrates computing system 600 in an exemplary implementation is shown. Computing system 600 provides an example of computing system 236, computing system 440, or any computing system that may be used to execute domain reputation analysis process 300 or variations thereof, although such systems could use alternative configurations. Computing system 600 includes processing system 601, storage system 603, software 605, communication interface 607, and user interface 609. Software 605 includes application 606 which itself includes domain reputation analysis process 300. Domain reputation analysis process 300 may optionally be implemented separately from application 606, as indicated by the dashed line in FIG. 6.

Computing system 600 may be representative of any computing apparatus, system, or systems on which application 606 and domain reputation analysis process 300 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for domain reputation analysis process 300 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 loads and executes portions of software 605, such as domain reputation analysis process 300, to facilitate domain reputation analysis and prevention of malicious attacks on a web service. Software 605 may be implemented in program instructions and among other functions may, when executed by computing system 600 in general or processing system 601 in particular, direct computing system 600 or processing system 601 to crawl web resources associated with the web service to obtain information about internal and external web assets associated with the web service. Software 605 may further direct computing system 600 or processing system 601 to process the information about the internal and external web assets to identify domains with which the internal and external web assets communicate. Software 605 may also direct computing system 600 or processing system 601 to analyze the domains to determine name server reputation, IP address reputation, and hosting provider reputation associated with the domains. Finally, software 605 may direct computing system 600 or processing system 601 to generate individual domain reputation scores for each of the domains based on the name server reputation, IP address reputation, and hosting provider reputation associated with the domains.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate domain reputation analysis and prevention of malicious attacks on a web service as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-readable storage media are characterized as primary or secondary storage.

In some examples, if the computer-readable storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or domain reputation analysis process 300 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate domain reputation analysis and prevention of malicious attacks on a web service, the method comprising:
    crawling web resources associated with the web service to obtain information about internal and external web assets associated with the web service;
    utilizing headless browser automation with a security scanner browser extension to intercept responses from the internal and external web assets based on the obtained information;
    dynamically injecting content security policy headers into the responses to determine dependency data associated with the internal and external web assets;
    identifying the domains with which the internal and external web assets communicate based on the dependency data;
    analyzing the domains to determine name server reputation, internet protocol (IP) address reputation, and hosting provider reputation associated with the domains;
    generating individual domain reputation scores for each of the domains based on the name server reputation, IP address reputation, and hosting provider reputation associated with the domains; and
    dynamically generating and deploying content security policies for the web service based on the individual domain reputation scores for each of the domains to protect the web service.

2. The method of claim 1 wherein crawling the web resources associated with the web service to obtain the information about the internal and external web assets associated with the web service comprises utilizing a scalable system of crawlers to passively scan the web resources and any associated Uniform Resource Identifiers (URIs) to obtain the information about the internal and external web assets associated with the web service.

3. The method of claim 1 wherein analyzing the domains to determine the name server reputation, the IP address reputation, and the hosting provider reputation associated with the domains comprises analyzing domain registration information associated with the domains to determine the name server reputation, the IP address reputation, and the hosting provider reputation associated with the domains.

4. The method of claim 1 wherein analyzing the domains to determine the name server reputation, the IP address reputation, and the hosting provider reputation associated with the domains comprises analyzing whether any name servers, IP addresses, or hosting providers associated with the domains were previously associated with malicious attacks.

5. The method of claim 1 wherein analyzing the domains to determine the name server reputation, the IP address reputation, and the hosting provider reputation associated with the domains comprises analyzing whether any name servers, IP addresses, or hosting providers associated with the domains were previously involved in hosting illegitimate activities.

6. The method of claim 1 wherein generating the individual domain reputation scores for each of the domains based on the name server reputation, the IP address reputation, and the hosting provider reputation associated with the domains comprises performing graph analysis on relationships between the internal and external web assets and generating the individual domain reputation scores for each of the domains based on the graph analysis.

7. The method of claim 1 wherein deploying the content security policies for the web service comprises deploying the content security policies via a Content Delivery Network (CDN).

8. An apparatus to facilitate domain reputation analysis and prevention of malicious attacks on a web service, the apparatus comprising:
    one or more computer-readable storage media;
    a processing system operatively coupled with the one or more computer-readable storage media; and
    program instructions stored on the one or more computer-readable storage media that, when executed by the processing system, direct the processing system to at least:
    crawl web resources associated with the web service to obtain information about internal and external web assets associated with the web service;
    utilize headless browser automation with a security scanner browser extension to intercept responses from the internal and external web assets based on the obtained information;

dynamically inject content security policy headers into the responses to determine dependency data associated with the internal and external web assets;
process the dependency data associated with the internal and external web assets to identify domains with which the internal and external web assets communicate;
analyze the domains to determine name server reputation, internet protocol (IP) address reputation, and hosting provider reputation associated with the domains;
generate individual domain reputation scores for each of the domains based on the name server reputation, IP address reputation, and hosting provider reputation associated with the domains; and
dynamically generate and deploy content security policies for the web service based on the individual domain reputation scores for each of the domains to protect the web service.

9. The apparatus of claim 8 wherein the program instructions direct the processing system utilize a scalable system of crawlers to passively scan the web resources and any associated Uniform Resource Identifiers (URIs) to obtain the information about the internal and external web assets associated with the web service.

10. The apparatus of claim 8 wherein the program instructions direct the processing system to analyze the domains to determine the name server reputation, the IP address reputation, and the hosting provider reputation associated with the domains by directing the processing system to analyze domain registration information associated with the domains to determine the name server reputation, the IP address reputation, and the hosting provider reputation associated with the domains.

11. The apparatus of claim 8 wherein the program instructions direct the processing system to analyze the domains to determine the name server reputation, the IP address reputation, and the hosting provider reputation associated with the domains by directing the processing system to analyze whether any name servers, IP addresses, or hosting providers associated with the domains were previously associated with malicious attacks.

12. The apparatus of claim 8 wherein the program instructions direct the processing system to analyze the domains to determine the name server reputation, the IP address reputation, and the hosting provider reputation associated with the domains by directing the processing system to analyze whether any name servers, IP addresses, or hosting providers associated with the domains were previously involved in hosting illegitimate activities.

13. The apparatus of claim 8 wherein the program instructions direct the processing system to generate the individual domain reputation scores for each of the domains based on the name server reputation, the IP address reputation, and the hosting provider reputation associated with the domains by directing the processing system to perform graph analysis on relationships between the internal and external web assets and generate the individual domain reputation scores for each of the domains based on the graph analysis.

14. The apparatus of claim 8 wherein the program instructions direct the processing system to dynamically deploy the content security policies via a Content Delivery Network (CDN).

15. One or more computer-readable storage media having program instructions stored thereon to facilitate domain reputation analysis and prevention of malicious attacks on a web service, wherein the program instructions, when executed by a computing system, direct the computing system to at least:

crawl web resources associated with the web service to obtain information about internal and external web assets associated with the web service;
utilize headless browser automation with a security scanner browser extension to intercept responses from the internal and external web assets based on the obtained information;
dynamically inject content security policy headers into the responses to determine dependency data associated with the internal and external web assets;
process the dependency data associated with the internal and external web assets to identify domains with which the internal and external web assets communicate;
analyze the domains to determine name server reputation, internet protocol (IP) address reputation, and hosting provider reputation associated with the domains;
generate individual domain reputation scores for each of the domains based on the name server reputation, IP address reputation, and hosting provider reputation associated with the domains; and
dynamically generate and deploy content security policies for the web service based on the individual domain reputation scores for each of the domains to protect the web service.

16. The one or more computer-readable storage media of claim 15 wherein the program instructions direct the computing system to utilize a scalable system of crawlers to passively scan the web resources and any associated Uniform Resource Identifiers (URIs) to obtain the information about the internal and external web assets associated with the web service.

17. The one or more computer-readable storage media of claim 15 wherein the program instructions direct the computing system to analyze the domains to determine the name server reputation, the IP address reputation, and the hosting provider reputation associated with the domains by directing the computing system to analyze domain registration information associated with the domains to determine the name server reputation, the IP address reputation, and the hosting provider reputation associated with the domains.

18. The one or more computer-readable storage media of claim 15 wherein the program instructions direct the computing system to analyze the domains to determine the name server reputation, the IP address reputation, and the hosting provider reputation associated with the domains by directing the computing system to analyze whether any name servers, IP addresses, or hosting providers associated with the domains were previously associated with malicious attacks.

19. The one or more computer-readable storage media of claim 15 wherein the program instructions direct the computing system to analyze the domains to determine the name server reputation, the IP address reputation, and the hosting provider reputation associated with the domains by directing the computing system to analyze whether any name servers, IP addresses, or hosting providers associated with the domains were previously involved in hosting illegitimate activities.

20. The one or more computer-readable storage media of claim 15 wherein the program instructions direct the computing system to generate the individual domain reputation scores for each of the domains based on the name server reputation, the IP address reputation, and the hosting provider reputation associated with the domains by directing the computing system to perform graph analysis on relationships between the internal and external web assets and generate the individual domain reputation scores for each of the domains based on the graph analysis.

\* \* \* \* \*